(No Model.) 9 Sheets—Sheet 2.

E. M. LOW.
ENVELOP MACHINE.

No. 594,884. Patented Dec. 7, 1897.

(No Model.) 9 Sheets—Sheet 4.

E. M. LOW.
ENVELOP MACHINE.

No. 594,884. Patented Dec. 7, 1897.

Witnesses:
J. C. S. Hastings
M. J. Galvin

Inventor:
Everett M. Low.
by J. C. Dewey
Attorney.

(No Model.) 9 Sheets—Sheet 7.

E. M. LOW.
ENVELOP MACHINE.

No. 594,884. Patented Dec. 7, 1897.

Witnesses:
J. C. S. Hastings
M. J. Galvin

Inventor:
Everett M. Low.
by J. E. Dewey
Attorney (No Model.)  9 Sheets—Sheet 9.

E. M. LOW.
ENVELOP MACHINE.

No. 594,884. Patented Dec. 7, 1897.

Witnesses:
H. S. Hastings
M. J. Galvin

Inventor:
Everett M. Low.
by J. C. Dewey
Attorney.

UNITED STATES PATENT OFFICE

EVERETT M. LOW, OF WORCESTER, MASSACHUSETTS, ASSIGNOR, BY MESNE ASSIGNMENTS, TO THE WORCESTER ENVELOPE COMPANY, OF SAME PLACE.

ENVELOP-MACHINE.

SPECIFICATION forming part of Letters Patent No. 594,884, dated December 7, 1897.

Application filed December 15, 1890. Serial No. 374,713. (No model.)

*To all whom it may concern:*

Be it known that I, EVERETT M. LOW, a citizen of the United States, residing at Worcester, in the county of Worcester and State of Massachusetts, have invented certain new and useful Improvements in Envelop-Machines; and I do hereby declare that the following is a full, clear, and exact description thereof, which, in connection with the drawings making a part of this specification, will enable others skilled in the art to which my invention belongs to make and use the same.

My invention relates to envelop-machines, and more particularly to certain parts of an envelop-machine—to wit, first, to the construction of the folding mechanism and more particularly of the back-flap folder, having a yielding pressure, and, second, to the mechanism for raising the folded envelop from the folding-box and to the nipper mechanism for seizing the folded envelop when so raised and for removing it from the folding-box.

The object of my invention is to improve upon the construction of the parts of an envelop-machine above mentioned and to simplify the construction and operation thereof and to produce better results than heretofore.

My invention consists in certain novel features of construction and operation of the parts of an envelop-machine above referred to, as will be hereinafter fully described.

I have shown in the drawings my improvements applied to an envelop-machine in which the blanks, of proper shape to form the folded envelops, are placed in the machine in a pile and are gummed and picked up by the pickers one at a time to be conveyed away to the folding mechanism; but my improvements may be applied to and used in connection with any ordinary form of an envelop-machine.

I have shown in the accompanying drawings only so much of an envelop-machine as is necessary to illustrate the nature of my invention and the construction and operation of my improved mechanisms, which may be used in connection with any of the old and well-known devices common in envelop-machines.

Referring to the drawings, Figure 1 is a side elevation of an envelop-machine with my improvements applied thereto. Fig. $1^a$ is a vertical cross-section taken on line $1^a \, 1^a$, Fig. 4, looking in the direction of arrow $h$, same figure. Fig. $1^b$ is a longitudinal central vertical section taken on line $1^b \, 1^b$, Fig. 4, looking in the direction of arrow $h$, same figure. Fig. $1^c$ is a sectional detail showing some of the parts of the machine that are not fully illustrated in Fig. 1. Fig. 4 is a plan view of the machine. Fig. $4^a$ is a sectional plan view of the machine, taken at the point indicated by the broken line $4^a \, 4^a$, Fig. 1, looking in the direction of arrow $i$, same figure, showing the carrying-slides as passing under the envelop-blank just before it is dropped from the picker. Figs. 5 to 16, inclusive, are shown on an enlarged scale. Fig. 17 is a detail showing a front elevation of the carrying-slides for the envelop-blank, looking in the direction of arrow j, Fig. 4ᵃ.

In the accompanying drawings, 1 is the table or top of the machine, to which most of the working parts are secured. Said top or table 1 is supported on the frame 2 in the ordinary way.

3 is the arch supported above the table 1, which supports the gummers and pickers.

4 is the arch supported upon the table 1 at the rear of the arch 3, in which the plunger-rods 5 and 5' have their bearings. Said arch 4 also supports part of the carriage mechanism, to be hereinafter described.

All of the above parts are constructed and arranged in the ordinary way in envelop-machines.

Figure 1:
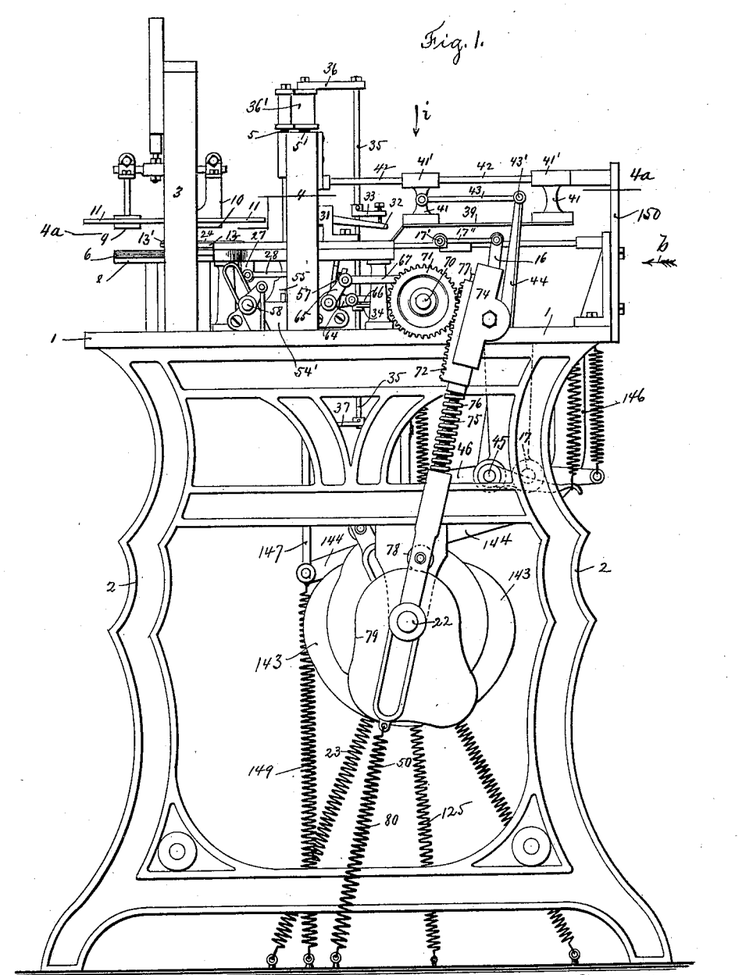
Figures 1A, 17:
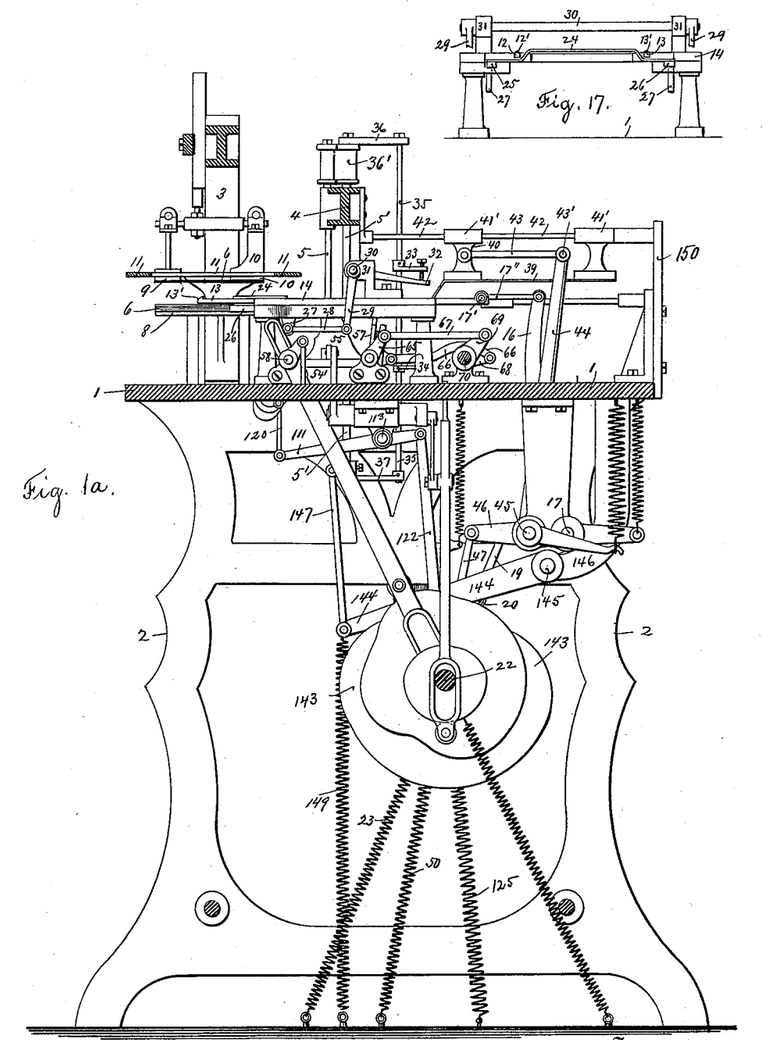
Figure 1B:
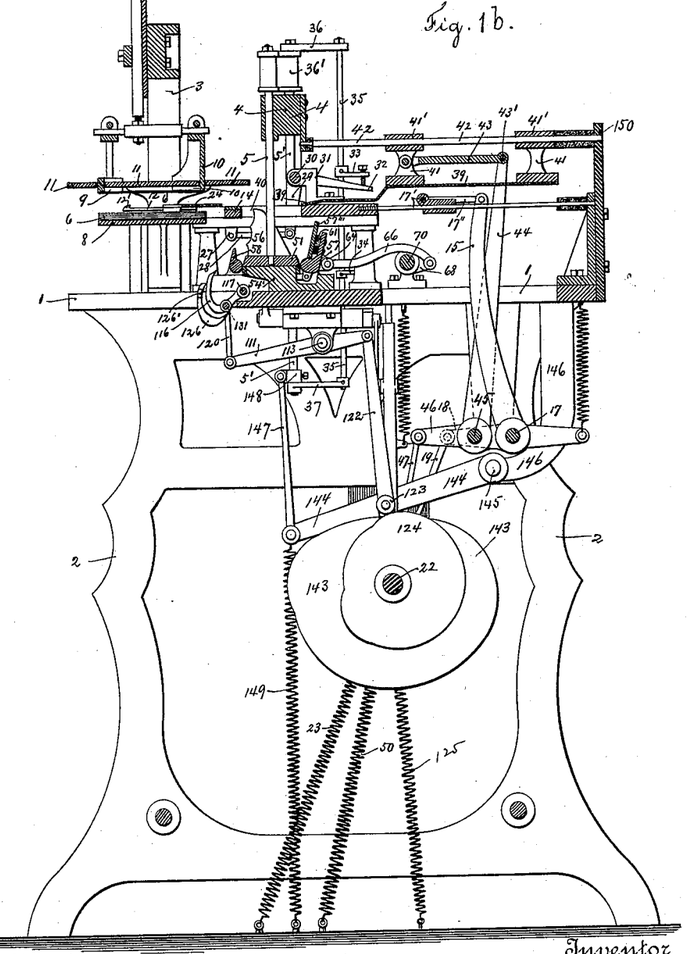
Figure 1C:
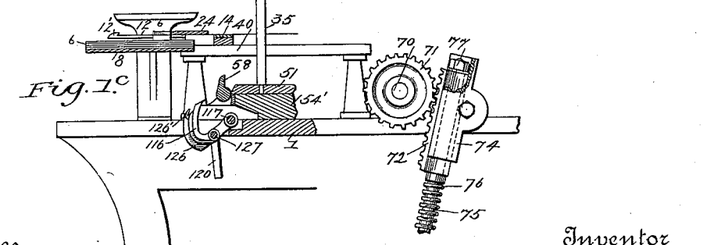
Figure 3:
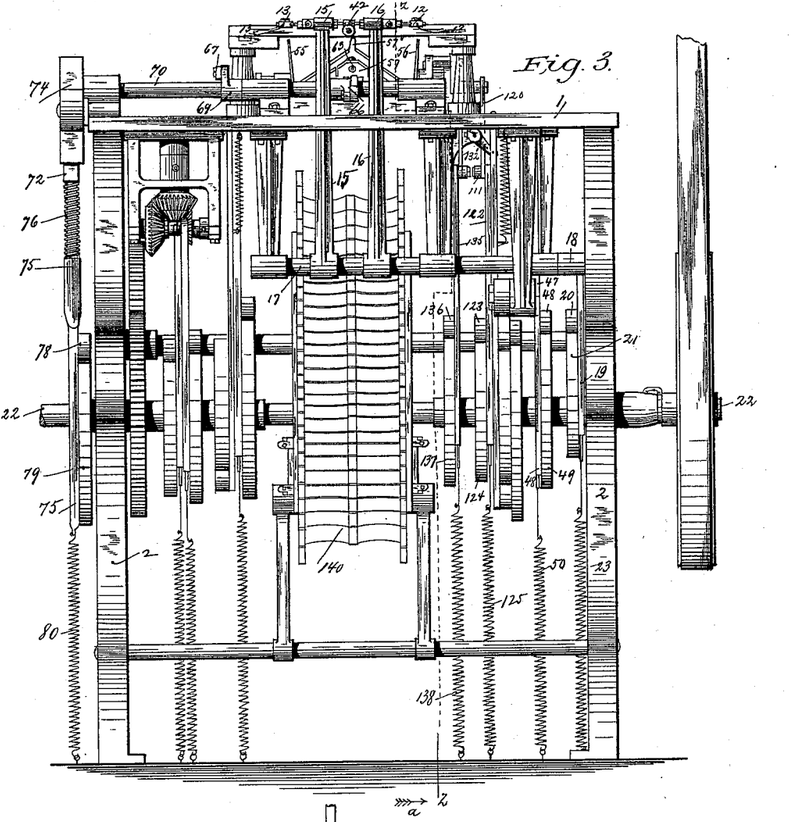
Fig. 3 is a rear elevation looking in the direction of arrow $b$, Fig. 1, some of the parts being removed.
Figure 4:
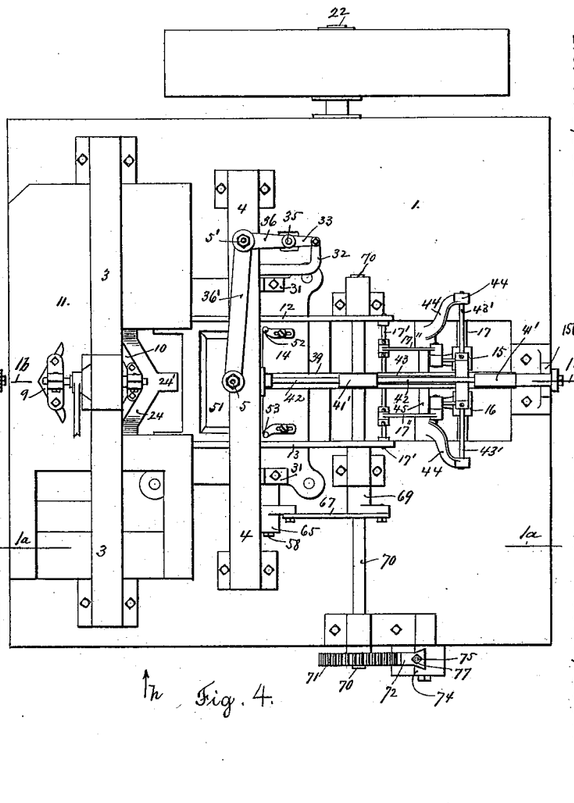
Figure 4A:
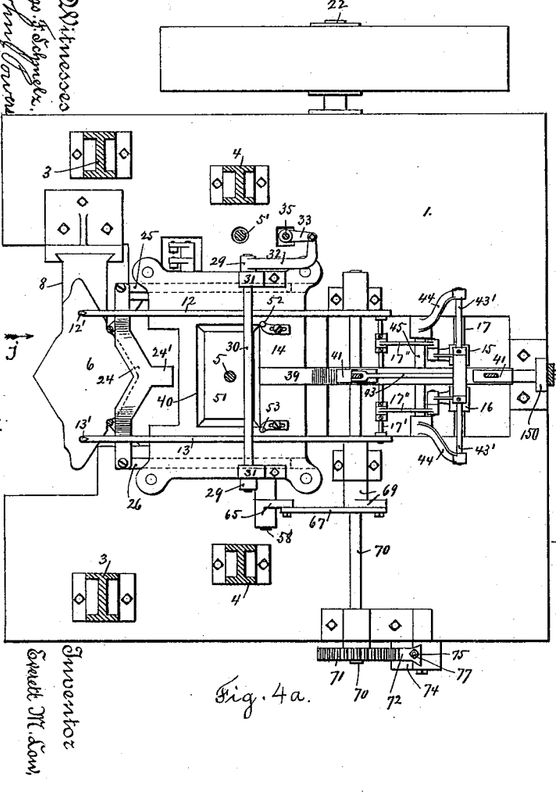

I will now describe the carrying mechanism by which the envelop-blanks are carried and supported at their leading point while being conveyed from the pickers to and over the creaser, where they are creased and then plunged into the folding-box. The envelop-blanks are picked up one at a time from the pile of blanks 6 on the table 8 (see Fig. 1) by pickers 9 and 10 in the ordinary way and are raised to the under side of the plate 11, where they dwell until the carriage-slides 12 and 13, sliding in ways formed in the creaser-plate 14, (see Fig. 4ᵃ,) pass under the envelop-blank 6. (See Figs. 1ᵇ and 4ᵃ, which show the slides in the act of passing under said envelop-blank.) When said slides 12 and 13 have fully passed under the envelop-blank 6, the pickers 9 and 10 rise still higher, bringing the envelop-blank against the plate 11 and dropping it onto the carriage-slides 12 and 13. The carriage-slides 12 and 13 are operated through rod 17' and connector 17'' by rocking arms 15 and 16 on a shaft 17, (see Figs. 1ᵇ, 3, and 4,) said shaft 17 being operated by a crank 18 and lever 19, carrying a roll 20 and cam 21 on the driving-shaft 22. (See Fig. 3.) A spring 23, attached to the lower end of lever 19, serves to keep the roll 20 in contact with its cam 21. (See Figs. 1ᵇ and 3.) It will be understood that the lever 19 is slotted at its lower end, and through its slot projects the driving-shaft 22 in the ordinary way. At the same time that the carriage-slides 12 and 13 move under the envelop-blank a thin plate 24, extending in the direction of the length of the envelop-blank, (see Figs. 4ᵃ and 17,) slides under the leading point of the blank, as represented in said Figs. 4ᵃ and 1ᵇ. This plate 24 supports the center of the envelop-blank, and the projecting arm 24' thereof prevents the leading point of the blank from catching on the edge of the creaser-plate 14 as it passes over it. The supporting-plate 24 has only a short movement, the arm 24' of said plate moving from the edge of the opening 40 in the creaser-plate 14 to the position it occupies in Fig. 4ᵃ. Said supporting-plate 24 is attached at its ends to the slides 25 and 26, having ways in the creaser-plate 14. Said slides 25 and 26 are operated from the downwardly-projecting ears 27, through the connector 28 and arms 29, on the shaft 30, rocking in boxes 31. (See Fig. 1ᵃ.) The shaft 30 has a rigid arm 32 secured thereon, which is operated by two tappets 33 and 34 on the vertically-moving rod 35. (See Figs. 1, 1ᵃ, 1ᵇ, 4, and 4ᵃ.) The rod 35 is operated by the vertically-moving rod 5', which is connected at its upper and lower ends, by arms 36 and 37, with said rod 35. (See Figs. 1ᵃ and 1ᵇ.) The upper end of the plunger-rod 5 is also connected with the upper end of the rod 5', to move with it and with the rod 35, by the arm or connector 36'. (See Fig. 4.) The rod 5' is operated so as to cause the rods 35 and the plunger-rod 5 to have a vertical reciprocating motion, by means of the cam 143, through the lever 144, pivoted at one end, at 145, on the lower end of the bracket 146, and connected at its other end to the lower end of the rod or connector 147. The upper end of said connector 147 is adjustably attached to the lower end of the rod 5' by a clamp 148. (See Fig. 1ᵇ.) A spring 149 is connected to the lever 144 and to the floor to draw said lever down when it is not raised by the cam 143. It will thus be seen that as the rod 5' moves up and down it communicates a corresponding up-and-down motion to the plunger-rod 5, carrying the plunger-plate 51 at its lower end, and also to the rod 35, carrying the tappets 33 and 34, and causing said tappets to strike the arm 32 alternately and rock the shaft 30 first in one direction and then in the other, and through the arms 29 and connectors 28 and the ears 27 to move the slides 25 and 26 back and forth and cause the supporting-plate 24, secured on their ends, to be moved toward and away from the creaser-plate 14. (See Figs. 1ᵃ and 17.) The time of the rod 5' is such and the tappets 33 and 34 are so placed on the rod 35, connected and moving with said rod 5', that the proper time and movement are given to the supporting-plate 24 through the intervening connections. As the carriage-slides 12 and 13 move back their outer hooked ends 12' and 13' (see Figs. 1ᵇ and 4ᵃ) extend over the front edge of the envelop-blank and draw it back. The supporting-plate 24, with the projecting arm 24', also moves back to the edge of the opening 40 in the creaser-plate 14, and then the envelop-blank slides over the projecting arm 24' of said supporting-plate. In order that the projecting point of the envelop-blank may be supported in passing over the opening in the creaser-plate 14, the supporting-strip 39 is moved across the opening in the creaser-plate 14, and as the leading point of the envelop-blank slides over the arm 24' of the supporting-plate 24 it slides onto the supporting-strip 39, which then moves back in the same time as the carriage-slides 12 and 13, and consequently supports the leading point of the envelop-blank over the rear edge of the opening 40 in the creaser-plate 14. The supporting-strip 39 (see Figs. 1ᵃ and 1ᵇ) is depressed or bent downwardly at its front portion, where the envelop-blank rests upon it as it moves over the opening 40 in the creaser-plate, and is attached at its rear portion to the lower ends of the cross-heads 41, the upper ends 41' of which are supported and slide on the rod 42, supported at its front end on the arch 4 and at its rear end on the stand 150. (See Fig. 1ᵇ.) The cross-heads 41, carrying the plate 39, are operated by means of connectors 43, rod 43', (see Fig. 4,) and arms 44, the lower ends of which are secured fast on a shaft 45, having a crank-arm 46 thereon, and a lever 47, carrying a roll 48, operated by a cam 49 on the driving-shaft 22. (See Figs. 1ᵇ, 3, and 4.) A spring 50 is attached to the lower end of the lever 47. After the envelop-blank has been brought over the opening 40 in the creaser-plate 14 and under the plunger-plate 51, attached to the plunger 5, and against the stops 52 and 53 (see Fig. 4) the plunger-plate 51 descends, pushing the blank through the opening in the creaser-plate and down into the folding-box. The plunger-plate then rises, leaving the envelop-blank creased on the lines of its folds and with its flaps standing vertical, or nearly so.

I will now proceed to describe another feature of my improvements, relating to the folding mechanism and the construction of the back-flap folder, by which the back flap of the envelop receives an equal pressure on its entire gummed surface. The folding-box is provided with the end-flap folders 55 and 56, the back-flap folder 57, and the seal-flap folder 58 in the usual way. After the envelop-blank has been left in the folding-box by the plunger-plate the end flaps are folded down in proper succession by the end-flap folders 55 and 56 (see Fig. 5) and the back flap is folded down by the back-flap folder 57 and its gummed edge pressed onto the edge of the end flaps. Then the seal-flap is folded down by the seal-flap folder 58, the freshly-gummed surface being held from contact with the rest of the envelop by resting on the edge of the end folders and the projecting point 57''' of the back-flap folder. Said folders are of the usual construction and operation, except the back-flap folder 57.

Figure 5:
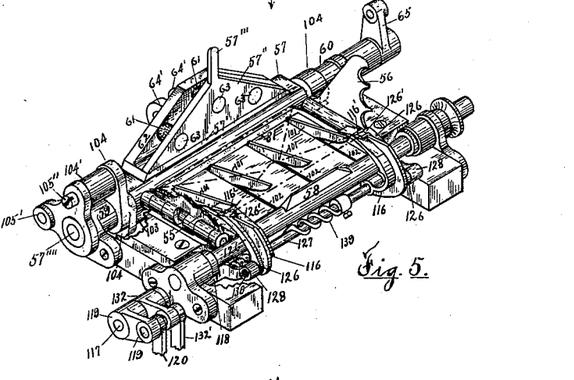
Fig. 5 is a perspective view of the folding and nipper mechanism, looking in the direction of arrow $c$, Fig. 6.
Figure 6:
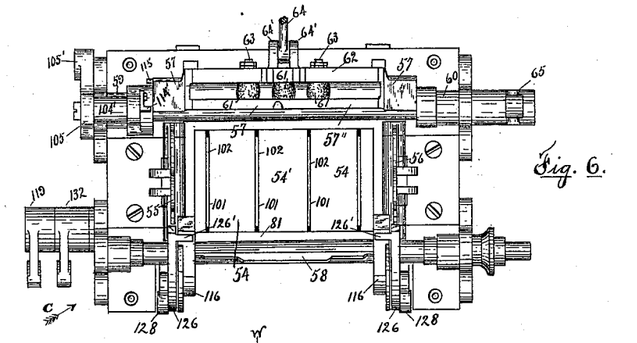
Fig. 6 is a plan view of the folding-box and folders, looking in the direction of arrow $d$, Fig. 5.

I will now proceed to describe the construction of the back-flap folder 57. (Shown in Figs. 5, 6, and 15.) The back-flap folder 57, consisting of the two plates 57'' and 62, is journaled in boxes 59 and 60. A narrow horizontal lip 57' at the lower portion of the folder on the front portion of the plate 62 forms the fold of the envelop, but is not wide enough to press the gummed surface of the back flap. Both the folding-lip 57' and the plate 57'' are of a shape to conform to the shape of the back flap of the envelop-blank, and said plate 57'' presses the gummed surface of the blank with a yielding pressure. Pieces of rubber 61 or other yielding material are inserted and held in place between said plate 57'' and the plate 62 at the rear thereof. (See Fig. 15.) The plate 57'' is attached to the plate 62 by means of bolts 63, which pass through said plate 57'', and the yielding pieces 61 and the plate 62 bind them all together, as shown in Fig. 6. Said bolts 63 are loose enough in the plate 57'' to allow of a slight amount of motion in said plate, so that it can adjust itself to any inequalities in the paper or gum or in the bed on which the envelop is folded. The back-flap folder 57 is preferably operated by two sets of cranks. (See Fig. 1ᵃ.) One crank 64 of the set is formed by the projecting ears 64', extending from the central portion of the back of the plate 62, (see Figs. 1ᵇ, 6, and 15,) and the crank 65 of the other set consists of an arm secured to the projecting end of one journal of the folder 57. (See Figs. 1, 1ᵃ, 4, 4ᵃ, 5, and 6.) The crank-arms 64 and 65 are arranged at an angle to each other relatively to the folder-plate 57. The crank-arms 64 and 65 are connected to the folder-plate 57. The crank-arms 64 and 65 are connected by rods or connectors 66 and 67 to the other crank-arms 68 and 69 of each set, fast on the rock-shaft 70. By using two sets of cranks connected with the back-flap folder at different angles relatively to each other for operating said folder it will be seen that after one set of cranks, as 65 and 69, has reached its dead-center the other set of cranks, as 64 and 68, will bring a direct pressure on the folder. On the end of shaft 70, carrying the crank-arms 68 and 69, is a spur-gear 71, operated by a rack 72, sliding in ways 74, secured on the machine. The rack 72 is supported on the upper end of a rod 75. The upper end of said rod passes loosely through a hole in the rack 72, and a spiral spring 76, placed between the enlarged part of the rod 75 and the end of the rack 72, acts to support the rack 72 in place on the rod 75 and to give a yielding pressure to the back-flap folder 57 through the intervening connections to prevent the breaking of the machine when more than one envelop gets into the folding-box at the same time. The rod 75 is prevented from being drawn out of the rack 72 by a nut 77 on the upper end of said rod above the rack. (See Fig. 1ᶜ.) The rod 75 carries a roll 78 thereon, which is operated by a cam 79 on the driving-shaft 22. A spring 80 is attached to the lower end of the rod 75. (See Fig. 1.) It will thus be seen that by means of the back-flap folder constructed as above described a yielding pressure is given to the back flap of the envelop.

Figure 9:
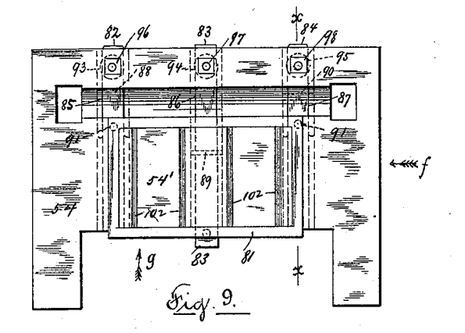
Fig. 9 is a plan view of the folding-box with the folders and lifting-blades removed, showing the ring-adjusting levers, the slots in which they work, and the pins on which they have their motion.
Figure 10:
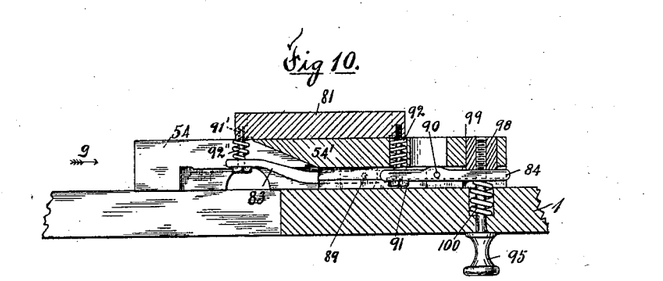
Fig. 10 is a cross-section on line $x\,x$, Fig. 9, looking in the direction of arrow $f$, same figure.
Figure 11:
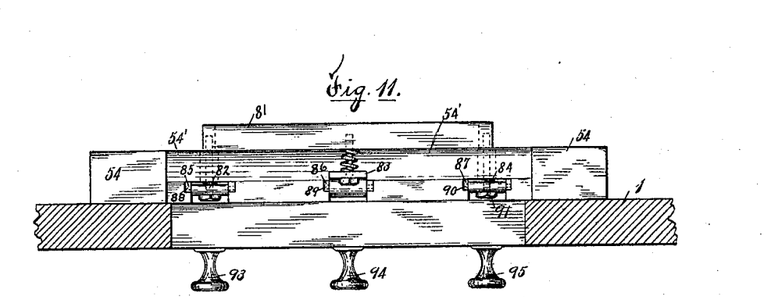
Fig. 11 shows the ring-adjusting mechanism, looking in the direction of arrow $g$, Figs. 9 and 10.

Surrounding the bed 54' of the folding-box 54 and inside the folders is a ring 81, fitted loosely and capable of vertical adjustment, for the purpose of folding envelops of different thickness on the edge of what is commercially called "halves and quarters." The ring 81 is adjusted and held in position by horizontal levers 82, 83, and 84, extending under said ring. (See Figs. 9, 10, and 11.) Said levers are supported in recesses 85, 86, and 87 in the bed 54' of the folding-box 54 and rock upon pins 88, 89, and 90, respectively, which pass through said levers 82, 83, and 84 and rest upon the lips of slots 85, 86, and 87. The levers 82 and 84 are shorter than the middle lever 83, and are attached only to the rear edge of the ring 81 by screws 91. (See Fig. 10.) A short spring or block, of some yielding material, 92, is placed between the levers and the rear edge of the ring, as shown in Fig. 10, for the purpose of making the ring capable of yielding slightly under the pressure of the folders when the blank is being folded, thereby folding the envelop smoother and without cracking it at the folded edge. The middle lever 83 is longer than the end levers 82 and 84, and is attached only to the front edge of the ring 81 in the same manner as the levers 82 and 84 are attached to the rear edge by a screw 91' and a spring 92'. (See Fig. 10.) The levers 82, 83, and 84 are adjusted by thumb-screws 93, 94, and 95, which pass up through the table 1 and are threaded to square nuts 96, 97, and 98, which rest on top of the levers and are held in a square box 99 above the levers, which prevent said nuts from turning. (See Figs. 9 and 10.) As the adjusting-screws 93, 94, and 95 are turned in one direction the nuts on said screws are drawn down and with them the levers. Said levers are supported and rock on the pins 88, 89, and 90, and when the inner ends of the levers are raised by turning down the thumb-screws the ring 81, supported at its rear edge on the end levers 82 and 84 and at its front edge on the lever 83, will be raised. When the adjusting-screws are turned in the opposite direction, the springs 100, supported on the screws under the front ends of the levers, (see Fig. 10,) raise the levers at their front ends and thereby lower the ring 81, supported on the rear end of said levers, as above described.

Figures 2, 16:
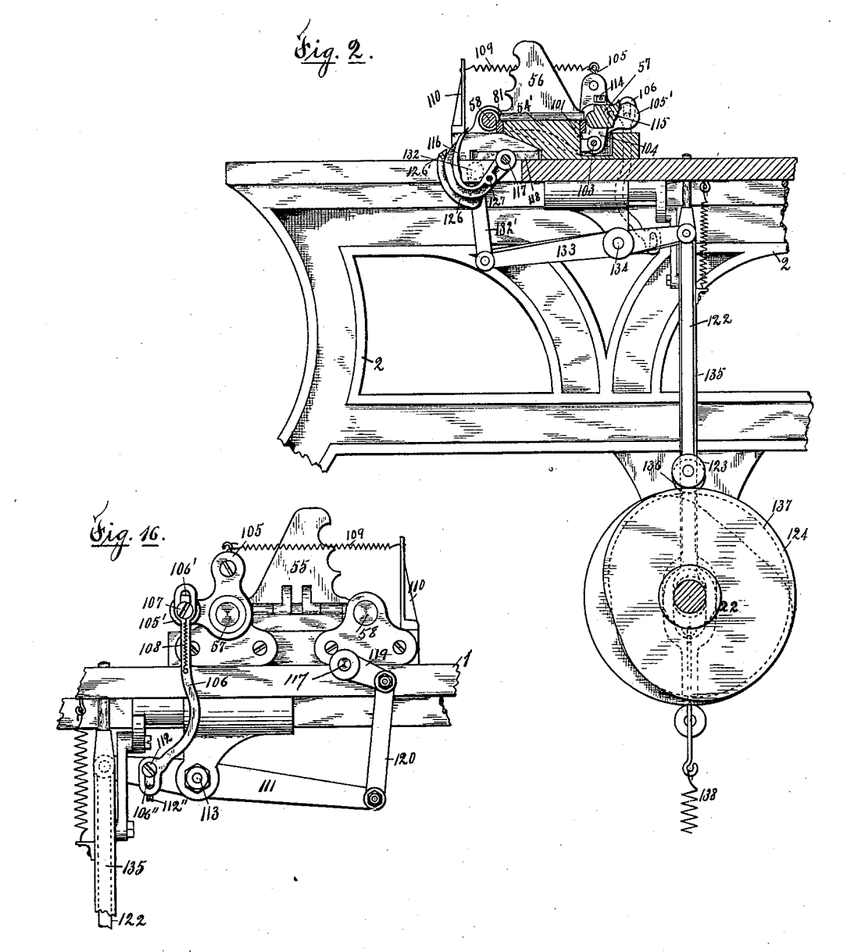
Fig. 2 is a vertical section on line $z\,z$, Fig. 3, looking in the direction of arrow $a$, same figure.
Fig. 16 is a detail of the levers and operating parts by which the lifting-blades are operated.
Figure 7:
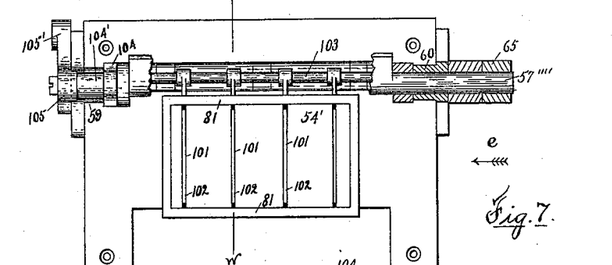
Fig. 7 is a plan view of the folding-box shown in Fig. 6, with the folders removed to show the lifting-blades, which pass through slots in the bed of the folding-box and at the proper time raise the folded envelop on one side high enough to be seized by the nippers and removed from the folding-box.
Figure 8:
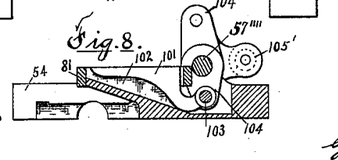
Fig. 8 is a cross-section of the folding-box and lifting-blades, taken on line $w\,w$, Fig. 7, looking in the direction of arrow $e$, same figure.

I will now proceed to describe another feature of my improvements, which relates to the mechanism which raises the folded envelop from the folding-box and to the nippers which seize and convey the envelop away. The envelop is raised from the bed 54' of the folding-box 54 by the lifting-blades 101, which move in slots 102 in the bed 54', and are rigidly secured on the rod 103, supported in hangers 104, which swing freely on the shaft of the back-flap folder 57. (See Figs. 7 and 8.) After the envelop is folded the seal-flap folder 58 rises high enough, which in practice would be about thirty degrees from the perpendicular, to allow the edge of the envelop to pass it as it is raised by the lifting-blades 101. The end-flap folders then rise to a little more than a vertical position, as shown in Figs. 5 and 6, and the back-flap folder 57 and lifting-blades 101 then rise, holding the folded envelop between them high enough for the envelop to be drawn over the seal-flap folder 58 by the nippers, which would be in practice about three-fourths of an inch to an inch, according to the width of the seal-flap folder required by different envelops. The back edge of the envelop is raised very little, as it is swung up from a center corresponding to that of the back-flap folder. The lifting-blades 101, fast on the rod 103, secured in hangers 104, are operated by the bell-crank 105, (see Figs. 7, 8, and 16,) journaled on the opposite projecting end of the back-flap folder 57, from the crank-arm 65. (See Fig. 5.) The outward-projecting arm 105' of said bell-crank 105 is attached by a screw 105'' to the upwardly-extending arm 104' of the hanger 104 on the end of the journal of the back-flap folder 57. (See Figs. 5, 6, 7, 8, and 16.) To the lower end of the bell-crank 105 is attached a slotted connector 106 by a screw 107, and a spring 108 is attached to said screw and to the connector. Said spring tends to keep the screw in the bottom of the slot 106' in the upper end of said connector 106, as shown in Fig. 16, against the action of the spring 109, secured to the other arm of the bell-crank 105 and to a stand 110 on the frame of the machine, (see Figs. 2 and 16,) which spring tends to keep the bell-crank 105 in the position shown in Fig. 16. When the connector 106 is drawn downward by the lever 111, the lifting-blades 101, through the intervening connections, will be raised. In the lower end of the connector 106 is a slot 106'', through which a screw 112 passes into the lever 111, pivoted on a stud 113 under the bed 1 of the machine. (See Fig. 16.) Said lever 111 also operates a part of the nipper mechanism to be hereinafter described. The connector 106 is attached to the lever 111 at such a point that the movement of lever 111 is sufficient to raise the lifting-blades 101 and with them the folded envelop. The additional movement of the lever 111 is taken up by the spring 108. When the nippers, to be hereinafter described, move out with the envelops, a reverse movement of lever 111 presses the screw 112 against the top of the slot 106'' in the lower end of the connector 106, moving said connector upward and with it the arm of the bell-crank 105, to which the upper end of said connector is attached, and moving the lifting-blades 101 below the level of the bed 54' of the folding-box 54 by means of the screw 112'' passing through the end of the slot 106'' in the lower end of the connector 106. Said connector is adjusted relatively to the lever 111 to the amount of movement required. The stop 114 (see Fig. 6) on the arm of the hanger 104 comes in contact with a stop 115 on the back-flap folder 57 and prevents the lifting-blades 101 from pressing the envelop against said back-flap folder as they rise together from the bed of the folding-box and makes up for any inequalities between the movements of the back-flap folder and the operating-lever 111. After the envelop has been seized by the nippers the back-flap folder 57 rises to an upright position and the stop 115 moves back away from the stop 114, but the lifting-blades 101 have reached the limit of their upward movement and can rise no farther, and as the lever 111 reverses its movement to remove the envelop from the folding-box by the action of the nippers the lifting-blades 101 drop back below the level of the bed of the folding-box, as above described.

Figure 12:
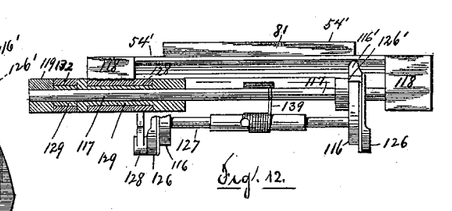
Fig. 12 is a sectional detail of the nippers and their operating parts.

I will now proceed to describe the nipper mechanism by which the folded envelops are seized and removed from the folding-box and deposited in the drying-chain or otherwise disposed of. The nipper mechanism consists of two pairs of nippers placed one at each end of the folding-box on the seal-flap-folder side of the box. The nippers are of substantially the shape shown in Figs. 13 and 14 of the drawings, consisting of the arms 116, fastened by a set-screw (not shown) or otherwise on the shaft 117, journaled in boxes 118. (See Fig. 5.) Upon the outer end of the shaft 117 is fast the crank-arm 119, operated through the connector 120 by the lever 111, pivoted at 113 under the bed 1 of the machine and connected with the cam-lever 122, carrying a roll 123, operated by cam 124 on the driving-shaft 22. A spring 125 is attached to the end of said cam-lever 122. By the movement of the cam 124 and the intervening mechanism a rocking motion toward and away from the folding-box is given to the nipper-arms 116. A movable nipper-arm 126 is supported and moved on each nipper-arm 116, by means of a shaft 127, extending between the two nipper-arms 116 (see Fig. 5) and journaled in bosses thereon. A motion is given to the movable nipper-arms 126, so that the same will be moved with and independently of the nipper-arms 116, by means of a crank-arm 128, fast on a sleeve 129, supported loosely on the shaft 117. (See Fig. 5 and sectional drawing Fig. 12.) The free end of the crank-arm 128 has a hole 130 therein, which fits loosely over a stud 131, extending out from the nipper-arm 126. The crank-arm 128, fast on the sleeve 129, is operated by the crank 132, fast on the sleeve 129, and by connector 132', attached to the lever 133, pivoted at 134 under the bed of the machine. (See Fig. 2.) Said lever 133 extends at the rear of the lever 111. (Shown in Fig. 16.) The other end of the lever 133 is connected with the cam-lever 135, carrying a roll 136, which is operated by the cam 137 on the driving-shaft 22. A spring 138 is attached to the lower end of the cam-lever 135. The outer end of the nipper-arm 126 is provided with a projection or lug 126', extending out at right angles therefrom and adapted to extend over and rest upon the flattened surface 116' of the nipper 116, as shown in Fig. 12, to nip and seize the envelop when the nipper 126 is closed or moved into the position shown in Fig. 13. A torsion-spring 139, secured on the shaft 127, with its free end bearing on shaft 117, serves to force over the upper end of the nipper-arm 126 and press it down onto the envelop held between the said nipper-arm 126 and the nipper-arm 116. This arrangement prevents any strain on the nippers or connections and prevents pinching the envelop so as to mark it, as it has only the tension of the torsion-spring to press on it. The manner of connecting the crank-arm 128 with the nipper 126 by the stud 131, extending into the hole 130 therein, above described, prevents the positive pressure of the end 126' of the nipper 126 on the envelop.

Figure 13:
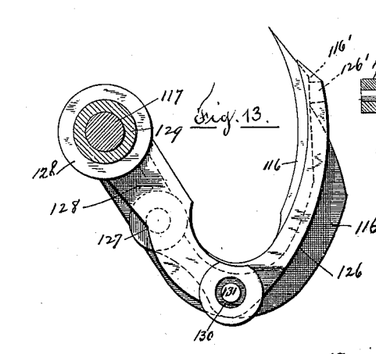
Fig. 13 is a detail of the nippers shown closed.
Figures 14, 15:
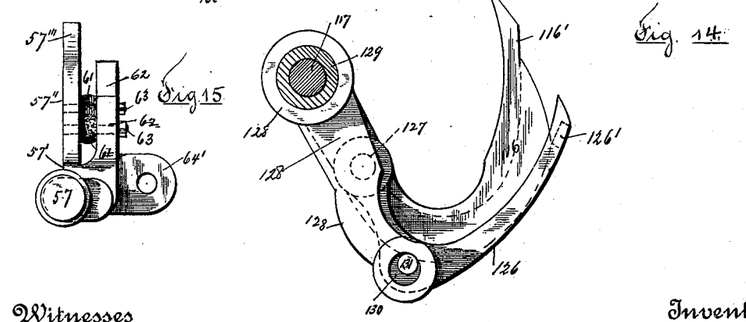
Fig. 14 is a detail of the nippers shown open.
Fig. 15 is a detail of the back-flap folder.

The operation of the nippers is as follows: The nipper 126 is in its downward position, as shown in Fig. 14, when the nippers are moved up toward the folding-box. As the envelop is raised from the bed of the folding-box between the lifting-blades 101 and the back-flap folder 57 the extreme end 116' of the nipper-arm 116 passes under the edge of the envelop, and the end 126' of the nipper 126 at the same time moves over the edge of the envelop. The two cams 124 and 137 are so made that while the cam 124 causes the nipper 116 to dwell at the edge of the folding-box the cam 137, through the intervening connections, moves the crank 132, sleeve 129, and crank-arm 128 and closes the nipper 126 down onto the nipper 116, so that the end 126' will come against the flattened end 116' of the nipper 116 and nip and seize the edge of the envelop. The cams 122 and 137 move the nippers 116 and 126 at the same speed in their return motion away from the envelop-folding box after having seized the envelop, and consequently the nippers remain closed on the envelop until they move out of the folding-box and until the nipper 116 nearly reaches the end of its movement, which is in practice about one-quarter revolution, when the nipper 126, by reason of an increased movement of its operating-cam 137, opens and releases the envelop, which drops into the drying-chain 140 or other receptacle. The nippers 116 and 126 are now moved back toward the folding-box, with the nippers 126 open, and the operation is repeated.

From the above description, in connection with the drawings, the operation of my several improvements relating to envelop-machines will be readily understood by those skilled in the art.

It will be understood that the details of construction of the several parts of my improved mechanisms may be changed some from what is shown and described, if desired.

Having thus described my invention, what I claim as new, and desire to secure by Letters Patent, is—

1. In the folding mechanism of an envelop-machine, the combination with the back-flap folder, consisting of the gummed-surface pressure-plate yieldingly supported on the plate which forms the fold of the envelop, of means for operating said back-flap folder, consisting of two cranks connected with the back-flap folder at different angles, for the purpose stated, and mechanism for operating said cranks, substantially as set forth.

2. In the folding mechanism of an envelop-machine, the combination with the back-flap folder, constructed so as to have a yielding pressure on the envelop-blank, of means for operating said back-flap folder, consisting of two cranks, connected with the back-flap folder at different angles, for the purpose stated, connectors from said cranks to two cranks on a shaft, a spur-gear on said shaft, a rack operating said gear, a cam-lever supporting said rack, and operating the same through the intervention of a spiral spring supported on said lever, for the purpose of giving a yielding pressure to the back-flap folder, through the intervening connections, substantially as set forth.

3. In the mechanism for raising the folded envelop from the folding-box, the combination with the back-flap folder having a stop thereon, of the lifting-blades extending through slots in the bed of the folding-box, and secured at one end on a rod, and means for operating said rod, so that said lifting-blades will be raised at the same time with the back-flap folder, holding the folded envelop between them, and a stop to come in contact with the stop on the back-flap folder, to prevent the envelop being pressed against said back-flap folder, substantially as set forth.

4. In the mechanism for removing the folded envelop from the folding-box, the combination with a pair of nipper-arms fast on a shaft, and means for operating said shaft to move the nipper-arms toward, and away from the folding-box at the proper time, of a second pair of nipper-arms fast on a shaft, supported on, and moving with the first-mentioned pair of nipper-arms, and having a motion independent thereof, for seizing and releasing the folded envelop, and means for operating the same, consisting of a crank-arm, having a hole in its outer end extending over a stud in one of said nipper-arms, and means for operating said crank-arm, and a spring on the shaft carrying the second pair of nipper-arms above mentioned, for giving a yielding motion thereto, for the purpose stated, substantially as set forth.

EVERETT M. LOW.

Witnesses:
J. C. DEWEY,
PHŒBE SYKES.